United States Patent [19]
Croyle et al.

[11] 3,756,479
[45] Sept. 4, 1973

[54] COFFEE DISPENSER

[75] Inventors: Jack V. Croyle, Woonsocket; James B. Swett, Barrington, both of R.I.

[73] Assignee: Dart Industries Inc., Los Angeles, Calif.

[22] Filed: Jan. 3, 1972

[21] Appl. No.: 214,722

[52] U.S. Cl. .............................................. 222/437
[51] Int. Cl. .......................................... G01f 11/26
[58] Field of Search............ 222/427, 452, 454–456, 222/434–437; 221/192, 196, 254, 265, 272; 239/392–395

[56] References Cited
UNITED STATES PATENTS

| | | | |
|---|---|---|---|
| 3,347,415 | 10/1967 | Strom | 222/436 X |
| 3,342,383 | 9/1967 | Klygis et al. | 222/454 |
| 2,211,452 | 8/1940 | Bowman | 222/452 X |
| 2,515,735 | 7/1950 | Saunders | 222/427 |
| 2,886,209 | 5/1959 | Lermer | 222/452 X |
| 2,006,019 | 6/1935 | Holesworth | 222/427 |
| 2,877,937 | 3/1959 | Weir | 222/452 |
| 1,523,065 | 1/1925 | Gessler | 222/455 |

*Primary Examiner*—Samuel F. Coleman
*Assistant Examiner*—Norman L. Stack, Jr.
*Attorney*—Leigh B. Taylor et al.

[57] ABSTRACT

A metering dispenser which will automatically measure a quantity of powdered or granular material and which will permit an immediately effective adjustment in metering volume to be made. The dispenser includes a container, a cup within the container sized to permit passage of material therearound and into the top of the container when such is inverted. The cup is open along its top side so that it collects and retains the material in the top thereof when the container is returned to its upright-position and that material begins its descent responsive to the reversion. When the container is again inverted, the material in the cup flows from the cup through a tube and out of the container. Rotation of the tube causes a varying proportion of the cup to be covered by the tube, thus permitting the volume of material passing through the tube to vary responsive to such rotation.

5 Claims, 11 Drawing Figures

INVENTORS.
JACK V. CROYLE
JAMES B. SWETT

BY

ATTORNEY

INVENTORS.
JACK V. CROYLE
BY   JAMES B. SWETT

ATTORNEY

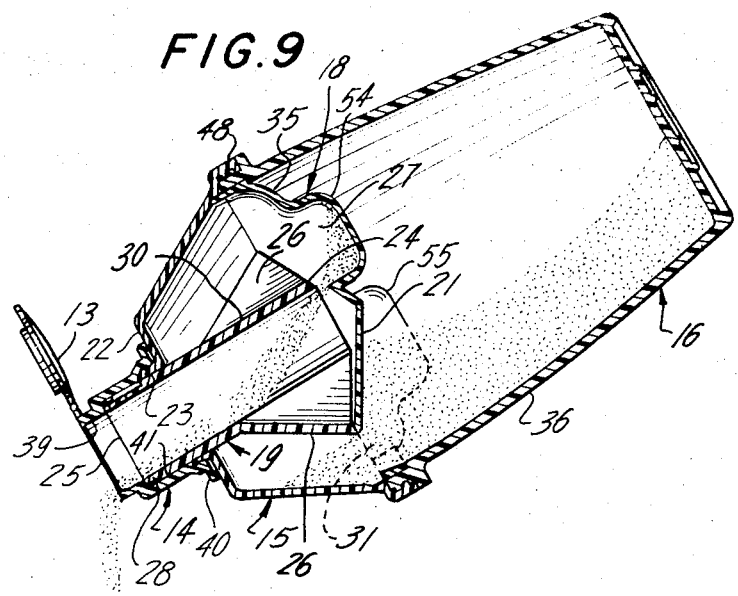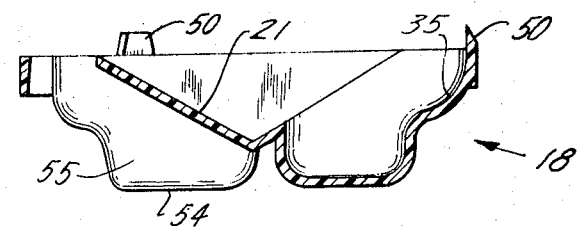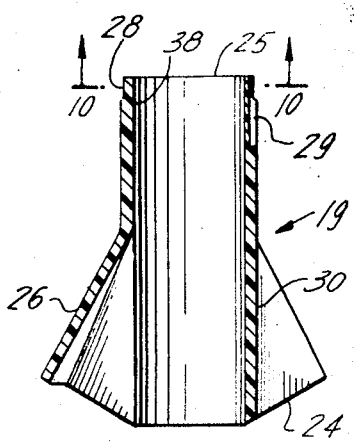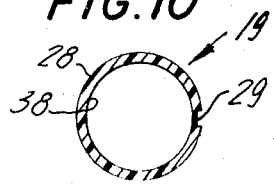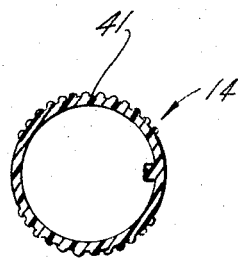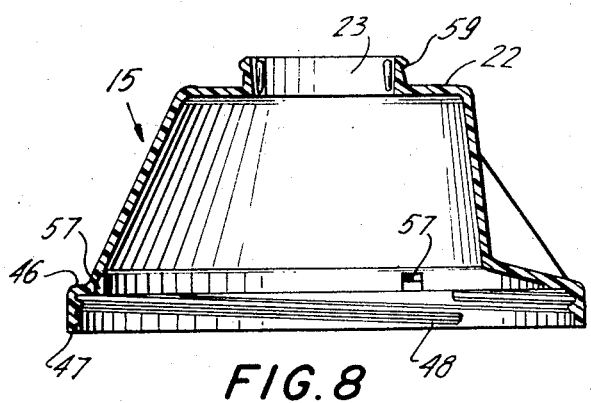

COFFEE DISPENSER

This invention relates generally to dispensers for powdered or granular materials and more particularly concerns a metering dispenser for materials such as instant coffee.

Powdered or granular materials have routinely been measured by placing the material in a measuring spoon or measuring cup and in some instances, attempts have been made to containerize such products for automatic dispensation. Of course, measuring powdered or granular materials by spoon and the like is time-consuming and the materials are frequently spilled during transfer from the storage container to the measuring device and from the measuring device to the bowl, cup or other container or elsewhere that the material is to be used. Similarly, attempts to make a storage container and dispenser which will automatically measure quantities of powdered or granular material have serious disadvantages, For example, these latter devices generally cannot be adjusted to measure varying volumes of material and those which do include such adjustable features usually are difficult for the average user to employ.

Those few metering dispensers in the prior art that do have easily adjustable volumetric flow control, however, cannot be made to be immediately effective. Instead, it is necessary to dispense material once more at the old volume before the adjustment becomes effective.

The metering dispenser of this invention automatically measures a quantity of powdered or granular material and enables an immediately effective adjustment in metering volume. The dispenser includes a multi-piece container adapted to have positioned therein at least one cup which is sized to permit passage of the material therearound and into the top of the container when such is inverted. The cup is, of course, open along its top surface and includes measuring and shield-like segments as integral parts. The container further employs a tube rotatably mounted in the container so that the crown or the top end of the tube passes through the top wall of the container and so that the bottom end of the tube covers a portion of the top surface opening of the cup.

In operation, the portion of the top surface opening of the cup which is covered by the tube is varied by rotating the tube. Then, as indicated, when the dispenser is inverted, the retained material passes around the cup and tube bottom end opening into the top of the container. When the dispenser is repositioned to an upright orientation, the material flowing from the top toward the bottom of the container fills the cup. When the container is again inverted, material flows from the cup through the tube to the exterior of the dispenser and simultaneously the cup is again filled for another cycle.

As assembled, the bottom end of the tube above mentioned is in juxtaposition with a portion of the top surface opening of the cup and covers or is covered by the measuring and shield segments thereof. The volume of flow from the dispenser is dependent upon what proportion of the tube bottom end is exposed to the cup measuring segment. Thus, simply by rotating the tube, its exposure to the measuring segment is varied and this immediately reflects that variance in the quantity of material which is dispensed.

The dispenser is ideally constructed to be used in the measurement of solids, however, it can be used with liquids provided that the volume of liquid in the container is less than either the volume of the portion of the container above the bottom end of the tube and/or the volume of the container below the top surface opening of the cup. This volume limitation is not necessary with granular and powdered materials since solids do not have an equal tendency with liquids to seek their own level and in the inverted container will not flow upward into the cup and down through the tube even though these materials are otherwise constant volume fluid-like materials similar to liquids.

Additional advantages and objectives of the invention will become apparent from the specification, claims and drawings wherein:

FIG. 6 is a cross-sectional view of the dispenser tube taken on line 6—6 of FIG. 1.

FIG. 7 is a cross-sectional view of the cup assembly taken on line 7—7 of FIG. 1.

FIG. 8 is a cross-sectional view of the top taken on line 8—8 of FIG. 1.

FIG. 9 is a cross-sectional view of the assembled dispenser as it would appear in operation.

FIG. 10 is a cross-sectional view of the tube taken on line 10—10 of FIG. 6.

FIG. 11 is a cross-sectional view of the cap taken on line 11—11 of FIG. 1.

Figure 1:
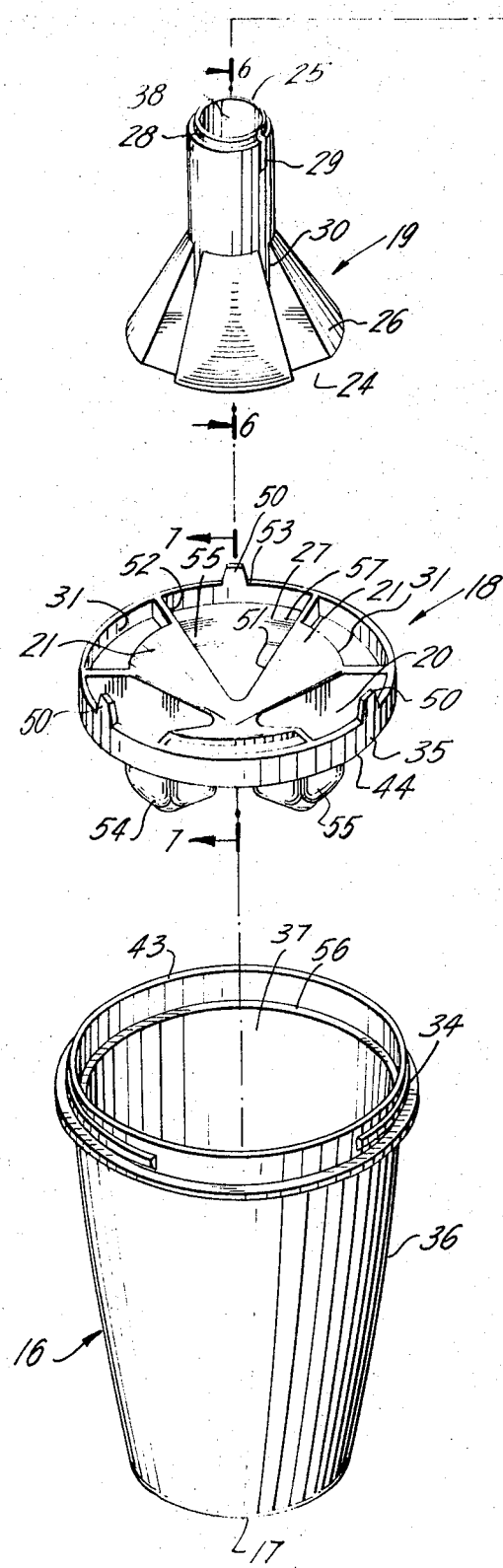
FIG. 1 is an exploded top perspective view of the dispenser.
Figure 1:
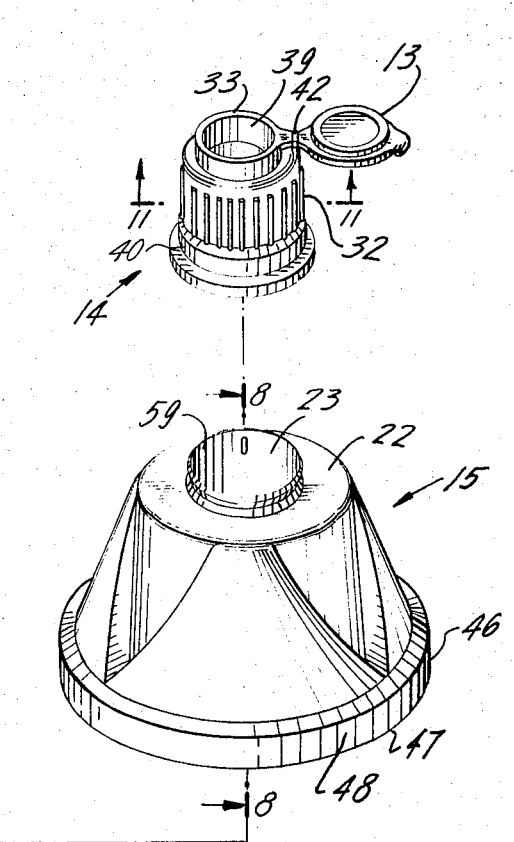
Figure 2:
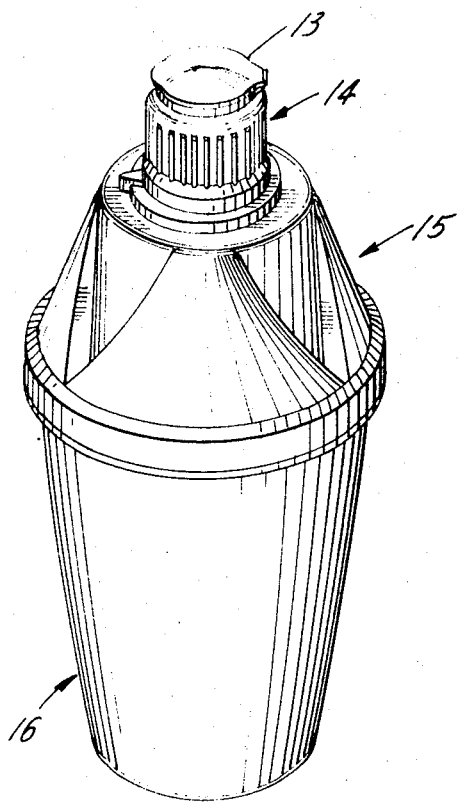
FIG. 2 is a top perspective view of the assembled dispenser.
Figure 3:
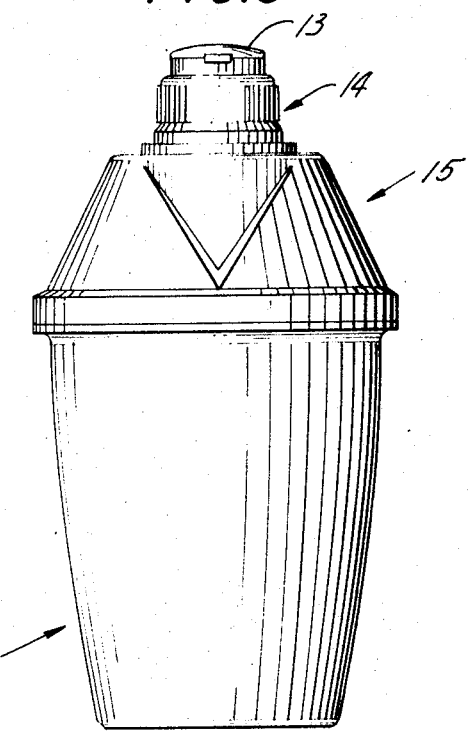
FIG. 3 is an elevational side plan view of the dispenser.
Figure 4:
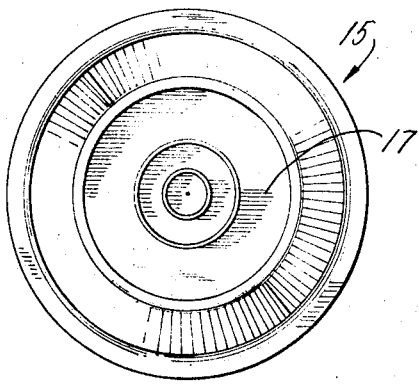
FIG. 4 is a bottom plan view of the dispenser.
Figure 5:
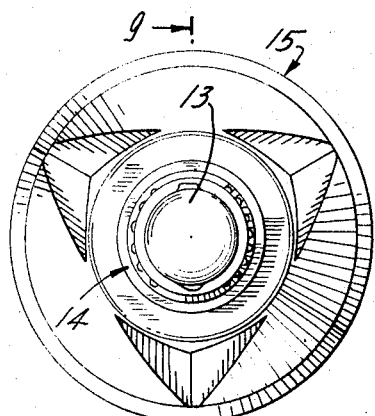
FIG. 5 is a top plan view.

In the preferred embodiment of the invention, the dispenser or container 10 includes a receptacle 16 and a removable top 15; a cap 14 and a closure 13; a dispensing tube 19; and a cup unit 18.

Receptacle 16 comprises a peripheral side wall 36 integral with a bottom wall 17. The top edge 43 of side wall 36 defines receptacle opening 37. Male threads 34 are provided on sidewall 36 proximate top edge 43. Just adjacent top edge 43 in the preferred embodiment is an inwardly extending flange 56.

Top 15 is made up of sidewall 46 having a bottom edge 47 which defines bottom opening 48 and an integral top wall 22 that includes a centrally positioned nozzle 23. Female threads 49 are provided proximate bottom edge 47 of top 15 for mating engagement with male threads 34 on receptacle 17.

Cup unit 18 includes a plurality of cups or measuring segments 27 separated by a plurality of tube shields 21. It should be appreciated, however, that one cup might be similarly employed and suffice for efficient operation. Each cup 27 is defined by sidewalls 51 and 52, curved backwall 53, and bottom wall 54. As is obvious from FIGS. 1 and 7, cups 27 in the preferred embodiment have a wedge shaped horizontal cross section and tube shields 21 are connected to uppermost edges of the sidewalls 51 and 52. Backwall 53 has two sections, bottom sections 55 which in conjunction with sidewalls 51 and 52 defines measuring portion and ring 35 which joins all cups and defines the outermost extent of cup unit 18. Note also that tabs 50 extend upwardly above the topmost extent of ring 35. These tabs as can be seen best in FIG. 8 engage with slots 57 in top 15 to retain the cup unit in a fixed relationship with respect thereto.

The top edges of sidewalls 51 and 52 and backwall 53 define the top end openings 20 of cups 27. Tube shields 21 connect only a portion of sidewalls 51 and 52 leaving a plurality of spaces or passageways 31 between cups 27 and ring 35. This construction enables retained material to bypass cups 27 and the tube shield 21 into top 15 when the assembled dispenser is inverted. Tube 19 is provided with a plurality of hollow wings 26 one for each cup 27 in cup unit 18. Wings 26 angle downward from a position intermediate the bottom end 24 and crown 25 of the tube to a position proximate bottom end 24 of the tube. A space 30 is provided between each wing 26 to permit material to bypass tube 19 in similar fashion to spaces 31 in the cup unit into top 15 when dispenser 10 is inverted. The upper portion of the tube is a neck 28 which is provided with a longitudinally extending groove 29, the interconnection and operation of which is more fully set forth hereinafter. Tube 19 is open at both bottom end 24 and crown 25, the latter opening forming tube orifice 38.

As best seen in FIG. 9, in operation dispenser 10 is inverted so that material passes from receptacle 16 through cup space 31 and tube space 30 into top 15. No material passes through tube 19 when dispenser 10 is first inverted because the entrance or bottom end 24 of tube 19 is protected by cups 27 and tube shield 21. The dispenser is then returned to its upright position and material flows from top 15 toward receptacle 16 and a portion of the material is directed to and collected in measuring segments or cups 27.

When the dispenser is again inverted, material which has collected in cups 27 flows through tube 19 to the exterior of dispenser 10. The portion of the material collected in cups 27 which passes through tube 19 to the exterior of dispenser 10 can be varied by turning cap 14 which turns tube 19. As tube 19 turns, the portion of the top surface opening of cups 27 which are covered by wings 26 of tube 19 varies and the flow through tube 19 from cups 27 is accordingly increased or decreased. Reverting the dispenser again fills cups 27 so they and dispenser 10 is again ready to dispense a metered amount of material.

As indicated, dispenser 10 is provided with a cap 14 which has an outwardly extending flange 41 having an inside diameter which will permit it to fit snugly, yet rotatably snap over upwardly extending nozzle 23 on top 15. Similarly, cap 14 has an inside diameter which will also snugly fit over neck 28 of tube 19 and as best seen in FIG. 11, the integral cap projection 41 fits into groove 29 in tube 19 shown in FIG. 10.

Above flange 41 on cap 14 are a series of projections 32 which provide a roughened surface thus assisting one to easily grip same. Also, cap 14 at its upper end is provided with a lip 33 which defines an opening 39, and incorporates a closure 13 that is attached to the cap by means of strap 42. Such closure therefore is readily hinged so that it may be employed in sealing the dispenser yet is always attached to the assembly.

As best seen in FIGS. 1 and 9, in order to assemble and fill dispenser 10, fluid-like material is introduced into receptacle 16 and cup unit 18 is replaced into receptacle 16 so that ring 35 is supported on flange 56. Top 15 is assembled with tube 19 and cap 14 with neck 28 of tube 19 passing through the central opening 23 and being secured to cap 14 by tubular projection 41 which fits into cap groove 29. Top 15 is thereafter screwed on to receptacle 16 such that the sealing bead 60 adjacent the threads 49 will mate with the top edge 43 of receptacle 16.

I claim:

1. A metering dispenser for granular material comprising:
   a. a closured receptacle adapted to retain a quantity of said material and including a support means therein,
   b. a cup unit positioned on said support means within the receptacle, said cup unit including at least one cup and shield area as a part thereof and further providing at least one passageway for the flow of material therearound when said dispenser is inverted, and,
   c. a rotatably mounted dispensing tube mounted in said receptacle and communicating with the exterior thereof said mounting being such that one end of the tube is in juxtaposition with said cup unit and covers a portion of the top surface opening of said cup, said juxtaposed tube end further having a means corresponding in shape to said shield area and which, depending on the rotary position of said tube, is closed by said shield area or in variably degrees, is exposed to the top surface opening of said cup.

2. The dispenser according to claim 1 wherein said cup unit incorporates three cups, secured together by a corresponding number of shields.

3. The dispenser according to claim 2 wherein said shields are conically disposed between said cups and wherein said juxtaposed dispensing tube end includes a like number of correspondingly shaped wings open to the interior thereof.

4. The dispenser according to claim 1 wherein a rotatably positionable cap is affixed to the receptacle exterior and said dispensing tube is interconnected therewith for movement responsive thereto.

5. The dispenser according to claim 1 wherein said cup unit includes means engaged with said dispenser that substantially restricts such unit from movement within the receptacle.

* * * * *